(12) United States Patent
Bayha et al.

(10) Patent No.: US 9,964,758 B2
(45) Date of Patent: May 8, 2018

(54) DEFLECTION MIRROR ARRANGEMENT FOR OPTICAL MEASUREMENT APPARATUS HAVING DRIVE UNIT BETWEEN PARALLEL TRANSMITTING MIRRORS AND CORRESPONDING OPTICAL MEASUREMENT APPARATUS

(75) Inventors: Heiner Bayha, Satow (DE); Peter Horvath, Vaihingen (DE); Thomas Schuler, Wiernsheim (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 296 days.

(21) Appl. No.: 13/876,488

(22) PCT Filed: Sep. 26, 2011

(86) PCT No.: PCT/EP2011/066669
§ 371 (c)(1),
(2), (4) Date: Oct. 9, 2013

(87) PCT Pub. No.: WO2012/045603
PCT Pub. Date: Apr. 12, 2012

(65) Prior Publication Data
US 2014/0029075 A1    Jan. 30, 2014

(30) Foreign Application Priority Data
Oct. 8, 2010   (DE) .......................... 10 2010 047 984

(51) Int. Cl.
*G02B 26/10*    (2006.01)
*G01S 17/08*    (2006.01)
(Continued)

(52) U.S. Cl.
CPC .......... *G02B 26/105* (2013.01); *G01S 7/4817* (2013.01); *G01C 3/08* (2013.01);
(Continued)

(58) Field of Classification Search
None
See application file for complete search history.

(56) References Cited

U.S. PATENT DOCUMENTS 3,772,464 A     11/1973 Chan et al.
4,037,971 A *   7/1977 Belleson et al. ........... 356/237.5
(Continued)

FOREIGN PATENT DOCUMENTS

DE     102005055572 B4    8/2007
EP         1760631 A1     3/2007
(Continued)

OTHER PUBLICATIONS

International Search Report issued in PCT/EP2011/066669 dated Dec. 7, 2011 (4 pages).
(Continued)

*Primary Examiner* — Stephone B Allen
*Assistant Examiner* — Ryan S Dunning
(74) *Attorney, Agent, or Firm* — Osha Liang LLP

(57) ABSTRACT

A deflection mirror arrangement for an optical measurement apparatus having at least one mirror unit, which is arranged on a rotatable shaft and includes at least one deflection mirror, and having a drive unit, which drives the rotatable shaft, and to an optical measurement apparatus having such a deflection mirror arrangement is disclosed. The at least one mirror unit may include at least two deflection mirrors, which are arranged in a common horizontal plane and spaced apart radially with respect to the rotatable shaft. The drive unit may be disposed at least partially in the space between the two deflection mirrors.

8 Claims, 3 Drawing Sheets

(51) Int. Cl.
*G01S 17/06* (2006.01)
*G02B 26/08* (2006.01)
*G02B 26/12* (2006.01)
*G01S 7/481* (2006.01)
*G01C 3/08* (2006.01)
*G01S 17/93* (2006.01)

(52) U.S. Cl.
CPC ............ *G01S 7/481* (2013.01); *G01S 7/4811* (2013.01); *G01S 17/06* (2013.01); *G01S 17/08* (2013.01); *G01S 17/936* (2013.01); *G02B 26/0816* (2013.01); *G02B 26/12* (2013.01); *G02B 26/121* (2013.01)

(56) References Cited

U.S. PATENT DOCUMENTS

| | | | |
|---|---|---|---|
| 5,559,320 A | | 9/1996 | Loya |
| 5,745,050 A | * | 4/1998 | Nakagawa ............... G08G 1/16 180/167 |
| 6,243,187 B1 | | 6/2001 | Inenaga et al. |
| 6,268,947 B1 | | 7/2001 | Zucchini et al. |
| 2008/0007710 A1 | * | 1/2008 | Zambon .................. G01S 7/481 356/5.01 |

FOREIGN PATENT DOCUMENTS

| | | |
|---|---|---|
| JP | S58-19993 B2 | 4/1983 |
| JP | S61-50084 A | 3/1986 |
| JP | H08-122061 A | 5/1996 |
| JP | 2006-38854 A | 2/2006 |

OTHER PUBLICATIONS

Office Action dated Apr. 24, 2015, in corresponding Japanese Patent Application No. 2013-532117 (with translation) (8 pages).
Office Action in corresponding Chinese Patent Application No. 201180048450.2 dated Jun. 19, 2015, with translation (17 pages).

* cited by examiner

DEFLECTION MIRROR ARRANGEMENT FOR OPTICAL MEASUREMENT APPARATUS HAVING DRIVE UNIT BETWEEN PARALLEL TRANSMITTING MIRRORS AND CORRESPONDING OPTICAL MEASUREMENT APPARATUS

The invention relates to a deflection mirror arrangement for an optical measurement apparatus and to a corresponding optical measurement apparatus having such a deflection mirror arrangement.

Scanning optical measurement apparatuses, referred to as laser scanners, which determine the distance from objects or obstacles detected in the monitoring region according to the light-pulse time-of-flight method, for vehicles for detecting objects or obstacles in a monitoring region are known from the prior art.

Patent specification DE 10 2005 055 572 B4 for example describes a scanning optical distance sensor. The distance sensor described comprises at least one laser as an optical transmitter, at least one detector as an optical receiver, and a deflection unit, which deflects generated laser radiation onto the scene to be measured using a first mirror, and deflects the laser pulses that are scattered back by objects onto the at least one detector using a second mirror. Here, the first and second mirrors are arranged on a common rotatable shaft, which is driven by a drive unit. The first mirror is arranged on a first holder and the second mirror is arranged on a second holder with an axial spacing from the first mirror, with the drive unit being arranged between the two holders. The at least one laser and the at least one detector with the associated electronics are arranged in an upright manner.

It is the object of the invention to develop a deflection mirror arrangement for an optical measurement apparatus such that it becomes possible to reduce the necessary installation space, and to specify a corresponding optical measurement apparatus.

This object is achieved according to the invention by a deflection mirror arrangement for a laser scanner and by an optical measurement apparatus. Further features which advantageously realize the embodiments of the invention are contained in the dependent claims.

The advantage achieved by the invention is that, owing to the fact that the drive unit is arranged in the space between the two deflection mirrors, the necessary installation space for the deflection mirror arrangement can be reduced. Thus, in particular the installation height of the deflection mirror arrangement can be reduced.

The fundamental idea of the invention is based on the realization of a mirror unit having two mirrors which are arranged spaced apart with respect to one another in a horizontal plane, and between which the drive unit is then arranged. Furthermore, mounting the mirror unit on both sides can be realized more easily by arranging the mirrors on a carrier plate or on a carrier body.

A deflection mirror arrangement according to the invention for an optical measurement apparatus comprises at least one mirror unit, which is arranged on a rotatable shaft and comprises at least one deflection mirror, and a drive unit, which drives the rotatable shaft. According to the invention, the at least one mirror unit comprises at least two deflection mirrors, which are arranged with a radial spacing from the rotatable shaft, with the drive unit being arranged at least partially in the space between the two deflection mirrors.

In one advantageous configuration of the arrangement according to the invention, the at least two deflection mirrors are arranged on a carrier plate, with the drive unit being arranged in a hole in the carrier plate. Thereby the two-sided mounting of the mirror unit can be realized more easily and deviations in the rotation movement can be reduced. In order to simplify the arrangement of the drive unit in the hole in the carrier plate, a circumferential collar can be formed at the edge of the hole.

The at least one mirror unit can be configured for example as a transmitting mirror unit having at least two transmitting deflection mirrors and/or as a receiving mirror unit having at least two receiving deflection mirrors.

In a further advantageous configuration of the arrangement according to the invention, a transmitting mirror unit having two transmitting deflection mirrors, which are arranged on the carrier plate having a hole such that they are radially spaced apart, and a receiving mirror unit having two receiving deflection mirrors are arranged on the common rotatable shaft such that they are axially spaced apart from one another, with the drive unit being arranged in the space between the two transmitting deflection mirrors. The two receiving deflection mirrors can be secured in each case on a side of a carrier body such that they are radially spaced apart. As a result, the two-sided mounting of the receiving mirror unit can be realized more easily and deviations in the rotational movement of the receiving mirror unit can be reduced. In order to sense a current rotational angle, an encoding disc can be arranged between the transmitting mirror unit and the receiving mirror unit below the carrier plate, which encoding disc can be evaluated to determine the rotational angle of the rotatable shaft.

In a further advantageous configuration of the arrangement according to the invention, the drive unit is configured as a stepper motor. In addition, the rotatable shaft can be mounted on both sides in order to avoid swaying movements and deviations.

The deflection mirror arrangement according to the invention can preferably be used in an optical measurement apparatus having at least one optical transmitter and at least one optical receiver.

Exemplary embodiments of the invention will be explained below in more detail with reference to a drawing, in which.

Figure 1:
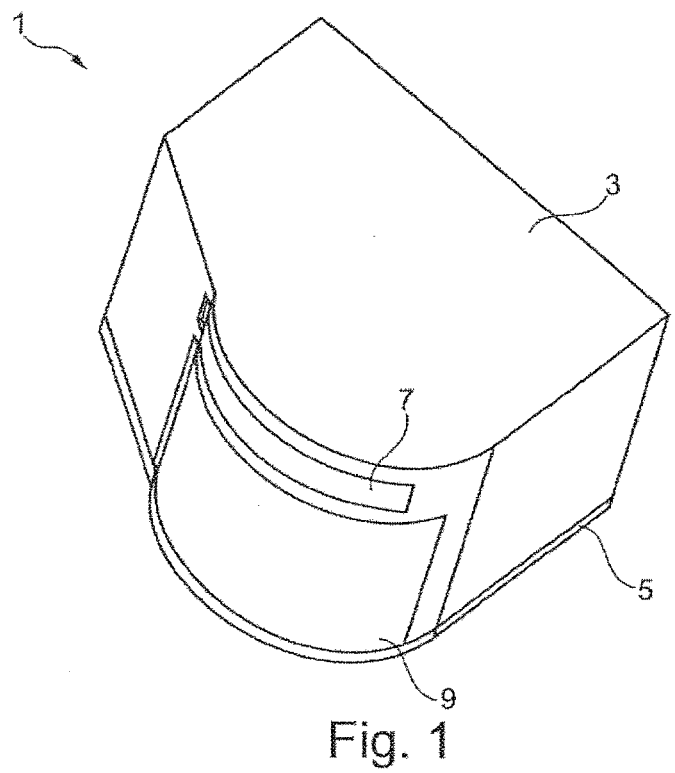
FIG. 1 shows a perspective illustration of an exemplary embodiment of an optical measurement apparatus according to the invention.

As shown in FIG. 1, an optical measurement apparatus 1 comprises a housing 3 having a bottom plate 5. Introduced into the housing are a transmitting window 7, through which for example pulsed laser light is emitted, and a receiving window 9, through which laser light reflected by objects in a monitoring region is received.

Figure 2:
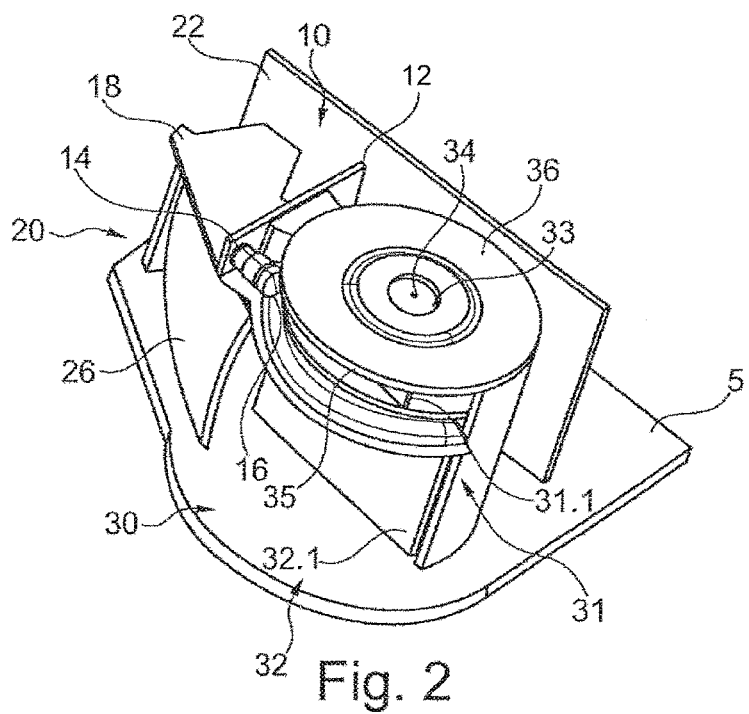
FIG. 2 shows a perspective detail illustration of the optical measurement apparatus from FIG. 1, without housing.
Figure 3:
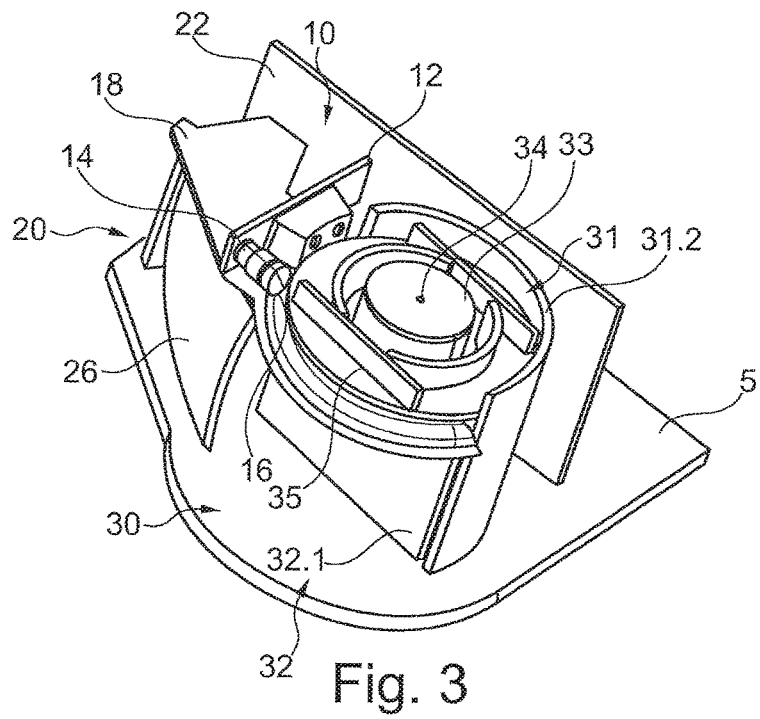
FIG. 3 shows a perspective detail illustration of the optical measurement apparatus from FIG. 1, without drive holder.
Figure 4:
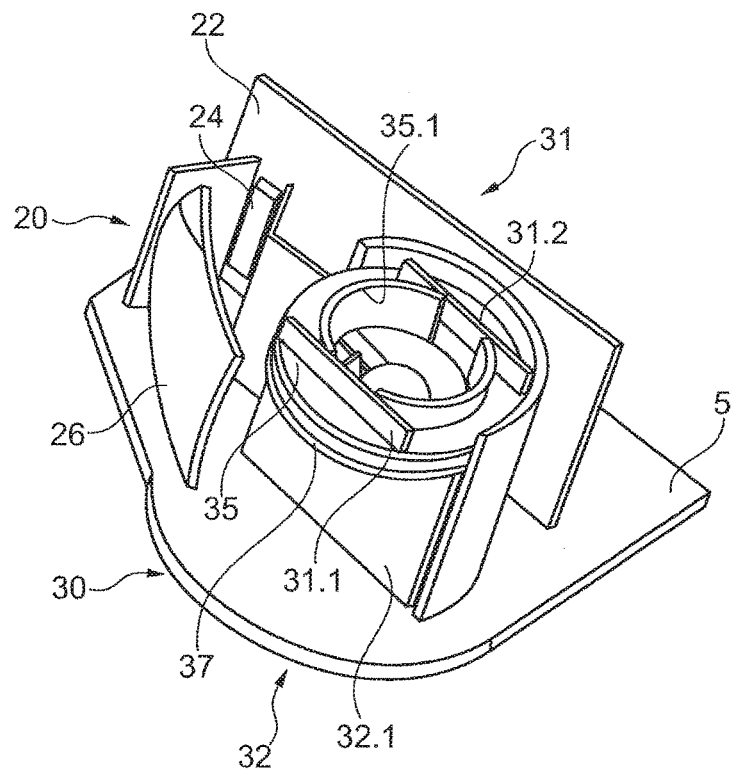
FIG. 4 shows a perspective detail illustration of the optical measurement apparatus from FIG. 1, without transmitter unit and without drive unit.
Figure 5:
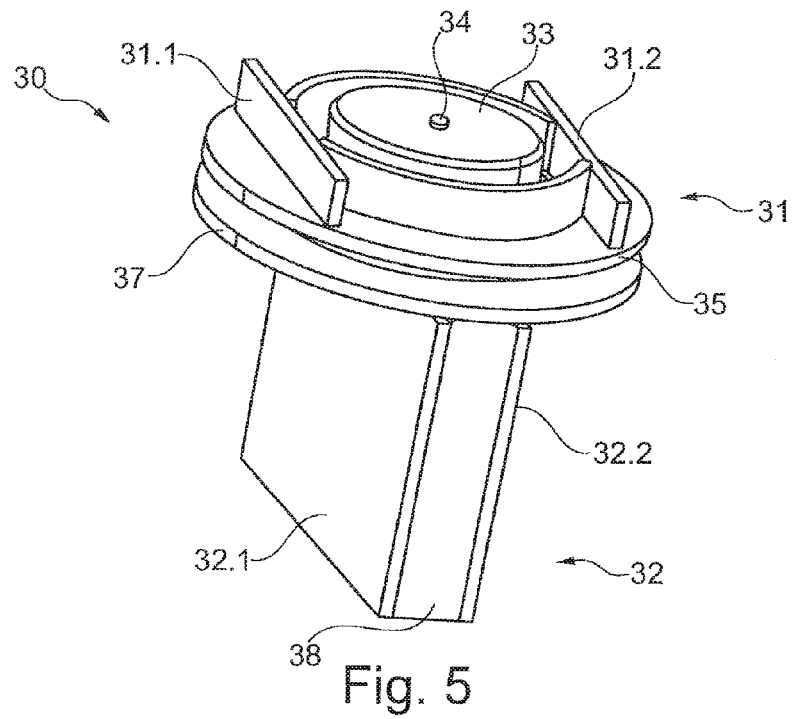
FIG. 5 shows a perspective illustration of an exemplary embodiment of a deflection mirror arrangement according to the invention for the optical measurement apparatus from FIG. 1.
Figure 6:
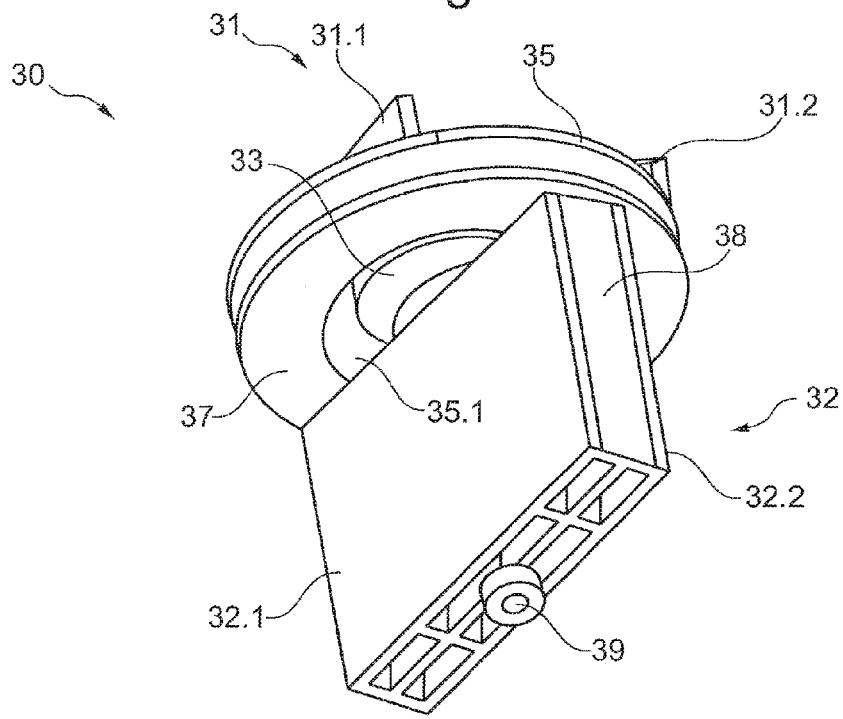
FIG. 6 shows a further perspective illustration of the exemplary embodiment of the deflection mirror arrangement according to the invention according to FIG. 5 from another observation angle.

As shown in FIGS. 2 to 4, a transmitter unit 10, a receiver unit 20 and a deflection mirror arrangement 30 are arranged inside the housing 3. The transmitter unit 10 comprises a transmitter circuit board 12, on which for example an optical transmitter 14, which is configured as a pulsed laser, with a transmission optical unit 16 is arranged. The transmitter circuit board 12 in the illustrated exemplary embodiment is mounted on a circuit carrier 18. The receiver unit 20 comprises a receiver circuit board 22, on which for example an optical receiver 24 configured as a detector is arranged, and a receiving optical unit 26, which is configured for example as a parabolic mirror.

As is shown in FIGS. 2 to 6, the deflection mirror arrangement 30 in the illustrated exemplary embodiment comprises a transmitting mirror unit 31 having two transmitting deflection mirrors 31.1, 31.2, which are arranged on a carrier plate 35 in a common horizontal plane such that they are radially spaced apart, and a receiving mirror unit 32 having two receiving deflection mirrors 32.1, 32.2, which are secured in each case on a side of a carrier body 38 such that they are radially spaced apart. As is further shown in FIGS. 2 to 6, the transmitting mirror unit 31 and the receiving mirror unit 32 are arranged on a common rotatable shaft 34 such that they are axially spaced apart with respect to one another.

According to the invention, a drive unit 33, which drives the rotatable shaft 34, is arranged substantially in the space between the two transmitting deflection mirrors 31.1, 31.2. In the illustrated exemplary embodiment, the drive unit 33 is arranged in a hole 35.1 in the carrier plate 35. A collar is formed at the edge of the hole 35.1 in the carrier plate 35 in order to simplify accommodation of the drive unit 33. The drive unit 33 is held by a holder 36, which is configured as a cover. In the illustrated exemplary embodiment, the drive unit 33 is configured as a stepper motor. Alternatively, other suitable motors and drives known to the person skilled in the art can be used for driving the rotatable shaft 34.

Arranged between the transmitting mirror unit 31 and the receiving mirror unit 32 below the carrier plate 35 is an encoding disc 37, which is evaluated to determine the rotational angle of the rotatable shaft 34. In order to evaluate the encoding disc 37, corresponding transducers or sensors can be arranged on the circuit carrier 18. Furthermore, the rotatable shaft 34 is mounted on both sides. At the upper end, the rotatable shaft 34 is mounted in the drive unit 33 and at the lower end it is mounted in a mount 39 which is introduceable into the bottom plate 5.

The result for the optical measurement apparatus is thus the mode of operation described below. The fixed optical transmitter 14 generates pulsed laser beams, which are deflected via the rotating transmitting mirror unit 31 and are radiated into the region to be monitored through the transmitting window 7. Pulsed laser beams are received via the receiving window 9, which laser beams are reflected by objects or obstacles, which are arranged in the monitoring region, in response to the emitted pulsed laser beams. The received laser beams are deflected via the receiving mirror unit 32 and are guided from the fixed receiving optical unit 26 to the fixed optical receiver 24. The output signal of the optical receiver 14 is evaluated to ascertain the time of flight of the laser beams in order to ascertain the distance from an object detected in the monitoring region.

The fundamental idea of the invention can also be used in a non-illustrated deflection mirror arrangement, which has a transmitting mirror unit and a receiving mirror unit which are not arranged on a common rotary shaft, but each have a dedicated drive unit. In such an embodiment, the drive unit for the transmitting mirror unit is arranged, as in the illustrated exemplary embodiment, substantially in the space between the two transmitting deflection mirrors, which are arranged in a common horizontal plane such that they are radially spaced apart with respect to the rotatable shaft. Furthermore, the drive unit for the receiving mirror unit is arranged substantially in the space between the two receiving deflection mirrors, which are arranged in a common horizontal plane such that they are radially spaced apart with respect to the rotatable shaft.

The invention claimed is:

1. A deflection mirror arrangement for an optical measurement apparatus, comprising:
   at least one receiving mirror unit, disposed on a rotatable shaft, comprising at least two receiving deflection mirrors, wherein the at least two receiving deflection mirrors are not joined by any other mirror in between them;
   at least one transmitting mirror unit, disposed on the rotatable shaft, comprising at least two transmitting deflection mirrors, wherein the at least two transmitting deflection mirrors are not joined by any other mirror in between them; and
   a drive unit, which drives the rotatable shaft, wherein
   each of the at least two receiving deflection mirrors and the at least two transmitting deflection mirrors are parallel and on opposite sides of the rotatable shaft, with the drive unit being arranged at least partially in the space between the two transmitting deflection mirrors,
   wherein the at least two transmitting deflection mirrors are arranged on and in direct contact with a carrier plate, with the drive unit arranged in a hole in the carrier plate and the at least one receiving mirror unit is separated above or below along an axis from the at least one transmitting mirror unit by an axial spacing, and
   wherein the carrier plate forms part of the axial spacing.

2. The arrangement according to claim 1, wherein a collar is formed at the edge of the hole in the carrier plate.

3. The arrangement according to claim 1, wherein the receiving deflection mirrors are secured in each case on a side of a carrier body such that they are radially spaced apart.

4. The arrangement according to claim 3, wherein an encoding disc capable of being evaluated to determine the rotational angle of the rotatable shaft, is arranged between the transmitting mirror unit and the receiving mirror unit below the carrier plate.

5. The arrangement according to claim 1, wherein the drive unit is configured as a stepper motor.

6. The arrangement according to claim 1, wherein the rotatable shaft is mounted on both sides.

7. An optical measurement apparatus, comprising:
   at least one optical transmitter;
   at least one optical receiver; and
   a deflection mirror arrangement comprising:
      at least one mirror unit, which is arranged on a rotatable shaft and comprises:
         at least one deflection mirror, and
         a drive unit, which drives the rotatable shaft,
      wherein the deflection mirror arrangement is configured according to claim 1.

8. The arrangement according to claim 1, wherein the arrangement further comprises a holder that holds the drive unit and wherein the holder is in direct contact with a surface of each of the at least two transmitting deflection mirrors opposite of a surface of each of the at least two transmitting deflection mirrors that is in direct contact with the carrier plate.

* * * * *